(12) United States Patent
Liu et al.

(10) Patent No.: US 9,424,885 B2
(45) Date of Patent: Aug. 23, 2016

(54) PRE-PROCESSING METHOD FOR VIDEO DATA PLAYBACK AND PLAYBACK INTERFACE APPARATUS

(71) Applicant: VIVOTEK INC., New Taipei (TW)

(72) Inventors: Chien-Wen Liu, New Taipei (TW); Ting-Wen Chen, New Taipei (TW); Tao-Cheng Yang, New Taipei (TW)

(73) Assignee: VIVOTEK INC., New Taipei (TW)

( * ) Notice: Subject to any disclaimer, the term of this patent is extended or adjusted under 35 U.S.C. 154(b) by 234 days.

(21) Appl. No.: 14/462,274

(22) Filed: Aug. 18, 2014

(65) Prior Publication Data

US 2015/0082174 A1    Mar. 19, 2015

(30) Foreign Application Priority Data

Sep. 18, 2013 (TW) .............................. 102133999 A

(51) Int. Cl.
*G06F 3/00* (2006.01)
*G11B 27/34* (2006.01)

(52) U.S. Cl.
CPC ..................... *G11B 27/34* (2013.01)

(58) Field of Classification Search
CPC ...................................................... G11B 27/34
USPC ....................................................... 715/720
See application file for complete search history.

(56) References Cited

U.S. PATENT DOCUMENTS

| | | | | |
|---|---|---|---|---|
| 7,739,143 B1* | 6/2010 | Dwarakanath | ..... | G06Q 30/0202 705/7.31 |
| 9,317,172 B2* | 4/2016 | Lyons | ..... | G06F 3/0481 |
| 2008/0155413 A1* | 6/2008 | Ubillos | ..... | G06F 3/0481 715/716 |
| 2008/0155459 A1* | 6/2008 | Ubillos | ..... | G11B 27/034 715/783 |
| 2009/0222764 A1* | 9/2009 | Kanda | ..... | G06F 3/0481 715/810 |
| 2010/0278504 A1* | 11/2010 | Lyons | ..... | G06F 3/0481 386/278 |
| 2010/0281372 A1* | 11/2010 | Lyons | ..... | G11B 27/034 715/720 |
| 2011/0026898 A1* | 2/2011 | Lussier | ..... | G11B 27/034 386/280 |
| 2013/0067333 A1* | 3/2013 | Brenneman | ..... | G06F 17/30796 715/721 |
| 2014/0022382 A1* | 1/2014 | Liu | ..... | H04N 7/181 348/143 |

* cited by examiner

*Primary Examiner* — William Titcomb
(74) *Attorney, Agent, or Firm* — Maschoff Brennan

(57) ABSTRACT

A pre-processing method for video data playback and a playback interface apparatus are provided, wherein a video receiver module receives a video data with clips, the clips corresponding to numbers in first and second time-sequences, and wherein a display module creates a corresponding GUI component for each clip and arranges the GUI components in the playback interface. When two clips consecutive in the first time-sequence are not consecutive in the second, the display module places their corresponding GUI components separately or distinguishably. By discerning the several time-sequences of the video data, this invention ensures random access of data while being visually intuitive and uniform design-wise.

14 Claims, 4 Drawing Sheets

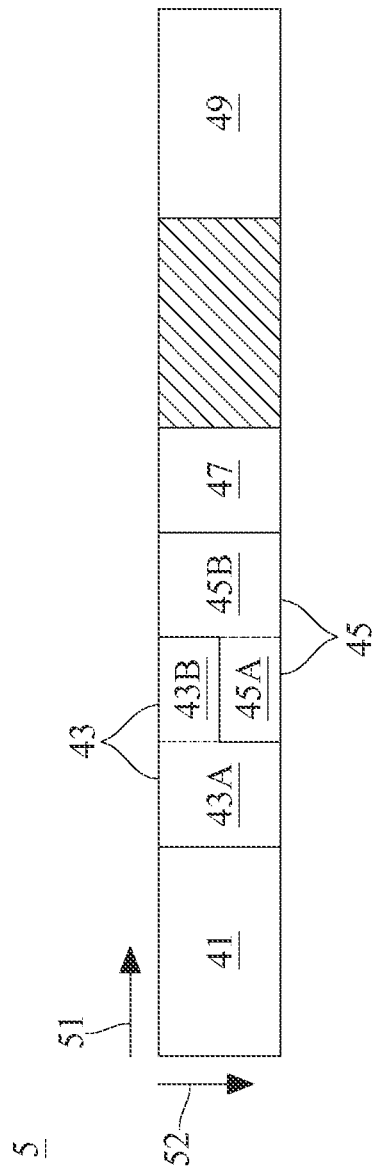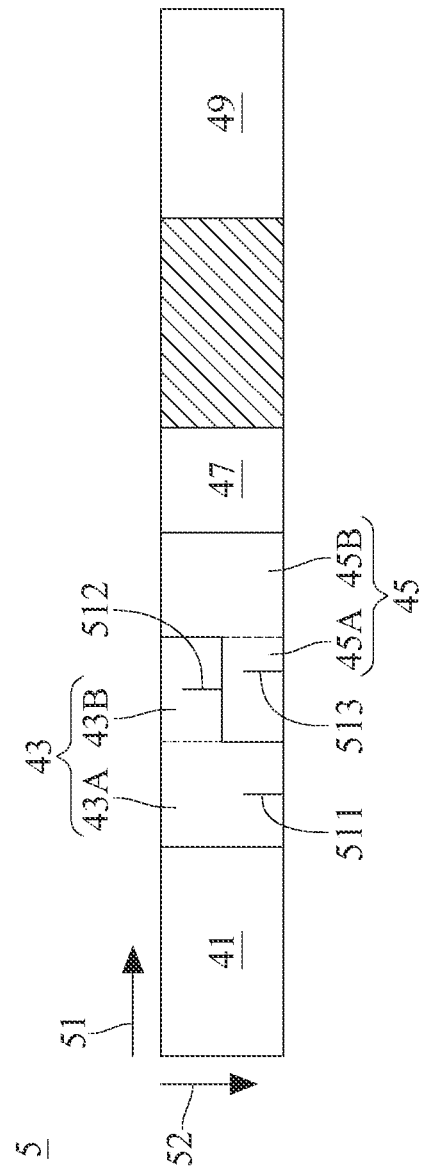

PRE-PROCESSING METHOD FOR VIDEO DATA PLAYBACK AND PLAYBACK INTERFACE APPARATUS

CROSS-REFERENCE TO RELATED APPLICATIONS

This non-provisional application claims priority under 35 U.S.C. §119(a) on Patent Application No. 102133999 filed in Taiwan, R.O.C. on Sep. 18, 2013, the entire contents of which are hereby incorporated by reference.

BACKGROUND OF THE INVENTION

1. Technical Field of the Invention

The present invention relates to a method and an interface apparatus for accessing video data, particularly to a processing method and a processing apparatus for arranging before playing back the video data the corresponding graphical user interface components according to its several time-sequences.

2. Description of the Related Art

Recorded video data is often accompanied by a time-sequence logging the time when the video was recorded. In a user interface displaying or for editing the video data, the time-sequence corresponds to a timeline on which a user can search clips of the video data.

In places where daylight saving time or summer time is implemented, "time" is artificially repeated or shortened twice a year. The clock is advanced (to the future) when daylight saving starts, usually before dawn, and usually by one hour. Human-beings therefore perceive that there are only 23 hours in the day daylight saving starts and that one hour is lost during the sleep. On the other hand, there are perceptually 25 hours in the day daylight saving ends, when the clock is adjusted back, and a certain hour is nominally experienced twice.

From an interface designer's point of view, it is more straightforward to uniformly represent "day" as a fixed length of time. If, however, there is artificial time repetition (e.g. caused by daylight saving), data recorded first will be overlapped by that recorded afterwards when displayed on the timeline, giving rise to the problem that the user does not know which data is currently being played, and that the user cannot select and manipulate the overlapped video data.

SUMMARY OF THE INVENTION

In consideration of the aforesaid problem regarding artificial time repetition or shortening, the present invention provides a pre-processing method for video data playback and a playback interface apparatus, so that uniformity of interface design is upheld, and the user is able to randomly and intuitively access data.

The pre-processing method for video data playback comprises: receiving a video data having a plurality of clips, wherein each of the clips corresponds to a first starting number and a first ending number of a first time-sequence and corresponds to a second starting number and a second ending number of a second time-sequence; for each of the clips, creating a corresponding graphical user interface (GUI) component in a playback interface; and arranging in the playback interface the GUI components corresponding to the clips according to the second starting numbers and the second ending numbers corresponding to the clips. When the first ending number corresponding to a first clip of the clips is essentially equal to the first starting number of a second clip of the clips and the second ending number corresponding to the first clip is essentially different from the second starting number corresponding to the second clip, the two GUI components corresponding to the first clip and the second clip are placed in the playback interface separately or distinguishably.

The playback interface apparatus comprises a video receiver module and a display module. The video receiver module is configured to receive a video data having a plurality of clips, wherein each of the clips corresponds to a first starting number and a first ending number of a first time-sequence and corresponds to a second starting number and a second ending number of a second time-sequence. The display module is configured to create a corresponding GUI component for each of the clips and arrange in the playback interface apparatus the GUI components corresponding to the clips according to the second starting numbers and the second ending numbers corresponding to the clips. When the first ending number corresponding to a first clip of the clips is essentially equal to the first starting number of a second clip of the clips and the second ending number corresponding to the first clip is essentially different from the second starting number corresponding to the second clip, the display module places the two GUI components corresponding to the first clip and the second clip separately or distinguishably in the playback interface apparatus.

In short, the present invention provides a pre-processing method for video data playback and a playback interface apparatus which deal with artificial time repetition or shortening caused by daylight saving, configuration error, or otherwise by discerning several time-sequences of the video data. Specifically, the present invention enables the user to play back and randomly access the video data on a timeline that agrees with human subjective perception, while maintaining the simplicity and uniformity of interface design.

The contents of the present invention set forth and the embodiments hereinafter are used to demonstrate and explain the present invention's spirit and theory, and to provide further explanation of the claims.

BRIEF DESCRIPTION OF THE DRAWINGS

The present invention will become more fully understood from the detailed description given hereinbelow and the accompanying drawings which are given by way of illustration only and thus are not limitative of the present invention and wherein:

FIG. 3 illustrates placing GUI components, according to an embodiment of the present invention.

FIG. 4 illustrates displaying an indicator icon on GUI components, according to an embodiment of the present invention.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The playback interface apparatus of the present invention comprises a video receiver module for receiving a video data. The data source of the video receiver module may be a live feed or recorded video from a webcam or a surveillance or IP (Internet Protocol) camera, and the video receiver module may be able to convert analog images into structured digital data. The video receiver module may obtain video files or streams of any form from the Internet or the playback interface apparatus itself. The video data received by the video receiver module has a plurality of clips, each of which may correspond to several frames of the video and may have an arbitrary temporal length. Each clip corresponds to a first starting number and a first ending number of a first time-sequence and to a second starting number and a second ending number of a second time-sequence. The formation of the clips in the video data and the corresponding time-sequences and numbers may be defined by the video receiver module or defined before the video data is received by the video receiver module.

Figure 1:
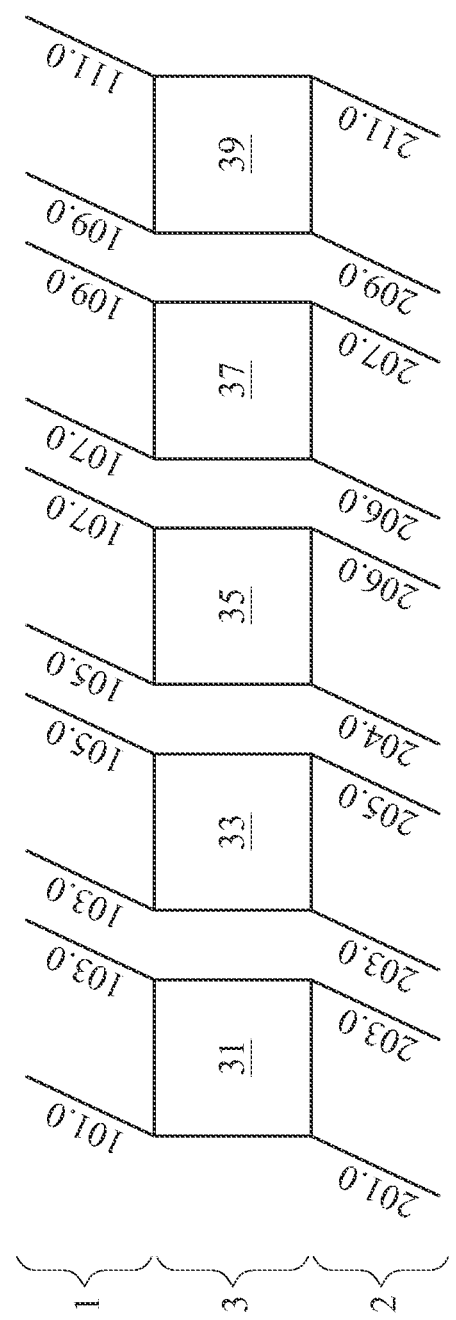
FIG. 1 illustrates a video data, a first time-sequence, and a second time-sequence, according to an embodiment of the present invention.

In one embodiment, the first time-sequence is a strictly increasing number series representing the order or time in which the clips were recorded or generated. The first time-sequence may consist of a customized, strictly increasing number series, such as "1, 3, 4, 9 . . . ", or it may signify Coordinated Universal Time (UTC). UTC is a standard time based on Greenwich Mean Time that is scientifically defined, globally synchronized, and referable around the world. The National Standard Time used in Taiwan, for example, is 8 hours ahead of UTC and thus expressed as UTC+8. The first starting numbers and the first ending numbers may be timestamps of UTC, such as "2013-09-03T20:46:33.45Z". The first time-sequence may as well be UNIX time, i.e. the total number of seconds elapsed since 12:00 a.m., Jan. 1, 1970 (UTC). The first starting number and the first ending number corresponding to each of the clips respectively stand for the starting and ending points of the clip in the first time-sequence. Suppose that the first time-sequence is a customized number series. As shown in FIG. 1, a clip 31 of a video data 3 starts at number 101.0 and ends at number 103.0 of the first time-sequence 1, immediately followed by a clip 33 which starts at number 103.0 and ends at 105.0, and so on.

The second time-sequence usually represents some local or civil time or may be any customized number series, so it may be without fixed intervals or order. In one embodiment, the second time-sequence is obtained from the Internet, for example via Network Time Protocol. Due to the local time potentially having adjustments like daylight saving, the second time-sequence may not be a strictly increasing number series. The standard time on the East Coast of the United States, for example, is 5 hours behind UTC (UTC-5), but every year, at 2:00 a.m. on the second Sunday of March, the clock is advanced by one hour; that is, the clock goes from showing 1:59 a.m. (standard time) directly to 3:00 a.m. (summer time). The clock is adjusted backward by one hour at 2:00 a.m. (summer time) every first Sunday of November, displaying 1:59 a.m. (summer time) and then 1:00 a.m. (standard time). The second starting number and the second ending number corresponding to each of the clips respectively stand for the starting and ending points of the clip in the second time-sequence. The second starting numbers and the second ending numbers may be timestamps of the local time adjusted through daylight saving, such as "2013-09-03T20:46:33.45+08:00". Moreover, the second time-sequence may as well be a customized number series. As shown in FIG. 1, the clip 33 of the video data 3 starts at number 203.0 and ends at number 205.0 in the second time-sequence 2, but another clip 35, starting at number 204.0 and ending at number 206.0, partially overlaps the clip 33 in the second time-sequence 2. A clip 37 starts at number 206.0 and ends at 207.0, but another clip 39 starts at number 209.0 instead of 207.0, the ending number of the clip 37.

The playback interface apparatus of the present invention further comprises a display module for creating a corresponding graphical user interface (GUI) component for each of the clips and arranging the GUI components in the playback interface apparatus. The display module may be a piece of application software or a webpage platform in conjunction with the video receiver module. The user may click, drag, or operate the GUI components in any GUI-possible manner to access or play back the clips. The GUI components corresponding to the clips may be split, transformed, or repositioned in the playback interface apparatus by the display module according to the numbers corresponding to the clips.

Figure 2:
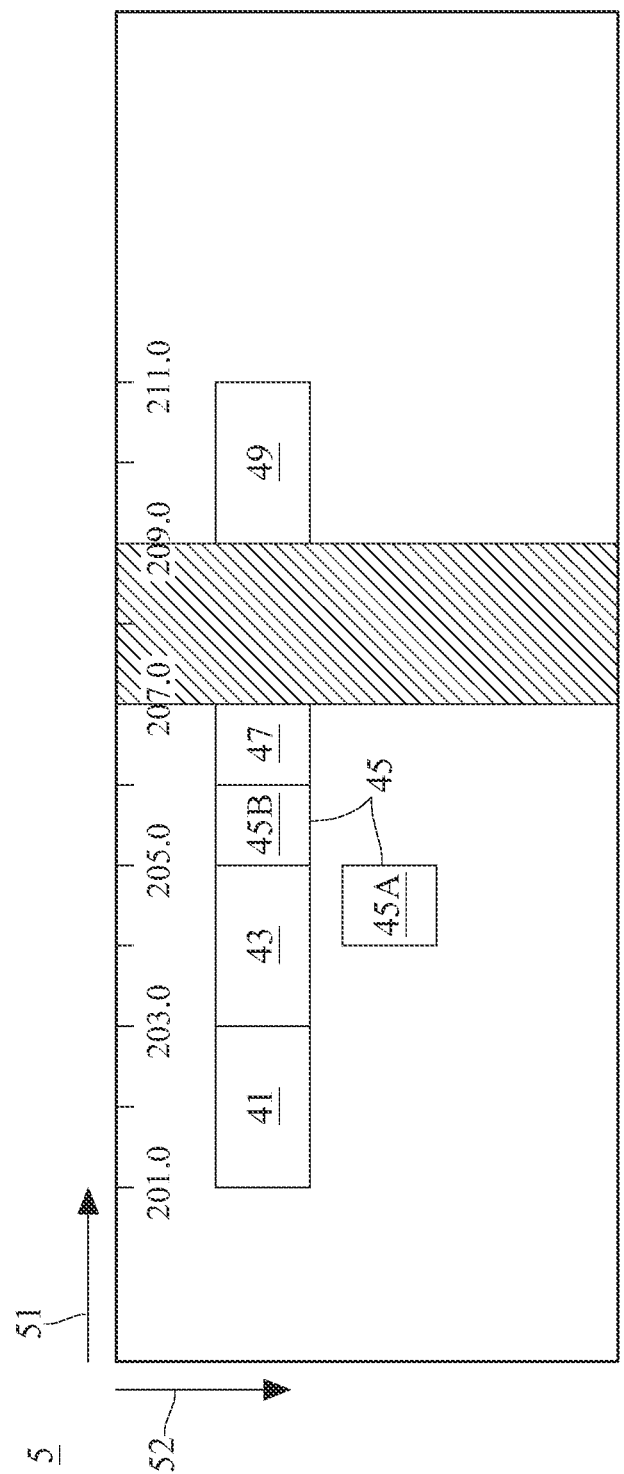
FIG. 2 illustrates placing GUI components in a timeline component, according to an embodiment of the present invention.

The display module places the GUI components according to primarily the second time-sequence. The display module may create a container (in GUI parlance) to hold those GUI components. As shown in FIG. 2, given that the second time-sequence is essentially still with temporal order, the container may be a timeline component 5 having a first dimension 51 and a second dimension 52. Please note that in other embodiments, the first dimension 51 and the second dimension 52 may not be orthogonal and may not be in certain fixed directions. In FIG. 2, the GUI component 41 corresponds to the clip 31 of FIG. 1, the GUI component 43 corresponds to the clip 33, and so on. According to the second starting numbers and the second ending numbers of the clips of the video data 3, the display module places the corresponding GUI components along the first dimension 51 in the timeline component 5. Because the staring number 203.0 corresponding to the clip 33 is the same as the ending number 203.0 corresponding to the clip 31, or equivalently the clip 33 immediately follows the clips 31 in the second time-sequence 2 as in the first time-sequence 1, the display module places the corresponding GUI components 41 and 43 in that order along the first dimension 51. The same applies to GUI component 45 and 47. The display module places the GUI component 45 and 47 in that order along the first dimension 51 for the clip 37 immediately follows the clip 35 in the second time-sequence 2 as in the first time-sequence 1.

The clip 35 immediately follows the clip 33 in the first time-sequence 1, but as described above, in the second time-sequence 2 the starting number 204.0 of the clip 35 actually comes earlier than the ending number 205.0 of the clip 33. In other words, these two clips 33 and 35 overlap in the interval between numbers 204.0 and 205.0. In light of this, and in one embodiment as shown in FIG. 2, the display module first places the GUI component 43, which corresponds to the clip 33, in succession to the GUI component 41, as it normally would. Then the display module splits a part 45A from the GUI component 45. The part 45A corresponds to numbers 204.0 to 205.0 in the second time-sequence 2, whereas the GUI component 45 corresponds to the clip 35. The display module places the part 45A below the GUI component 43 along the second dimension 52, because in the first time-sequence 1 the clip 35 follows the clip 33. The remaining, non-overlapping part 45B of the GUI component 45 is still placed along the first dimension 51.

The clip 39 immediately follows the clip 37 in the first time-sequence 1, but as described above, in the second time-sequence 2 there is actually a gap between the starting number 209.0 of the clip 39 and the ending number 207.0 of the clip 37. In other words, the numbers 207.0 and 209.0 form a skip interval in the second time-interval 2 that corresponds to no video data at all. In light of this, and in one embodiment as shown in FIG. 2, the display module first places the GUI component 47, which corresponds to the clip 37, in succession to the GUI component 45, as it normally would. Then the display module deliberately places the GUI component 49, which corresponds to the clip 39, at a location where the GUI component 47 is away by a distance, in order to demonstrate that there is not any other GUI component or playable clip of video data 3 between these two GUI components 47 and 49 (the oblique-lined area in FIG. 2).

Please note that the numbers need not be exactly identical to be considered essentially equal; that is, there might be a difference between two essentially equal numbers, but the difference is several orders of magnitude smaller than the numbers themselves. For example, suppose that the first starting number corresponding to the clip 33 is 103.1 instead of the first ending number corresponding to the clip 31, 103.0. Since the difference between the two numbers, 0.1, is infinitesimal compared to "103" itself, the clip 33 can still be regarded as immediately following the clip 31. On the contrary, the ending number 207.0 of the clip 37 and the starting number 209.0 of the clip 39 are essentially different and cannot be considered essentially equal because the skip interval formed by these two numbers is large enough to contain a meaningful clip.

The display module may present the timeline component 5 and the GUI components in FIG. 2 more aesthetically and user-friendly, as illustrated by the embodiment of FIG. 3. In FIG. 3, the edges of the timeline component 5 tightly enclose all the GUI components. The oblique-lined area between the GUI components 47 and 49 is still without any other GUI component and represents a skip interval where there is not a playable clip. The GUI component parts 43B and 45A, which respectively correspond to the overlaps of the clips 33 and 35, are of the same size and arranged along the second dimension 52. The GUI component parts 43A and 43B form a complete, undivided yet transformed GUI component 43; the GUI component parts 45A and 45B form a complete, undivided yet transformed GUI component 45. In other words, the GUI component parts 43B and 45A have horizontally split the timeline component 5, demonstrating the parts where the corresponding clips 33 and 35 overlap with each other. In other embodiments, the part 45A of the GUI component 45 need not be placed below the part 43B of the GUI component 43. As a matter a fact, the overlapping parts of the GUI components 43 and 45 can designed as seen fit by any person skilled in the art, e.g. implemented as another container, a drop-down menu for example, so that the user is able to switch between and select the overlapping parts 43B and 45A. In other embodiments, the area between the GUI components 47 and 49 may not be populated with oblique lines; a blank, a filling color, or another pattern may be used instead. In one embodiment, the video data 3 is played back according to the first time-sequence 1; that is, while playing the video data 3, the partial clip corresponding to overlapping part 43B is played ahead of that corresponding to the overlapping part 45A because the clip 33 is followed by the clip 35 in the first time-sequence 1. In one embodiment, the display module may further display an indicator icon, for instance a line segment perpendicular to the first dimension 51, at a first position in the GUI component corresponding to the clip currently being played, wherein the first position corresponds to a second position in the video data 3. Indicator icons 511, 512, and 513 in FIG. 4 serve as examples of that line segment.

Said GUI components or GUI component parts, such as 41, 43A, 43B, 45A, 45B, etc, may or may not be selected and manipulated by the user with, say, a mouse cursor. Said manipulation may be play, delete, and so on.

Figure 5:
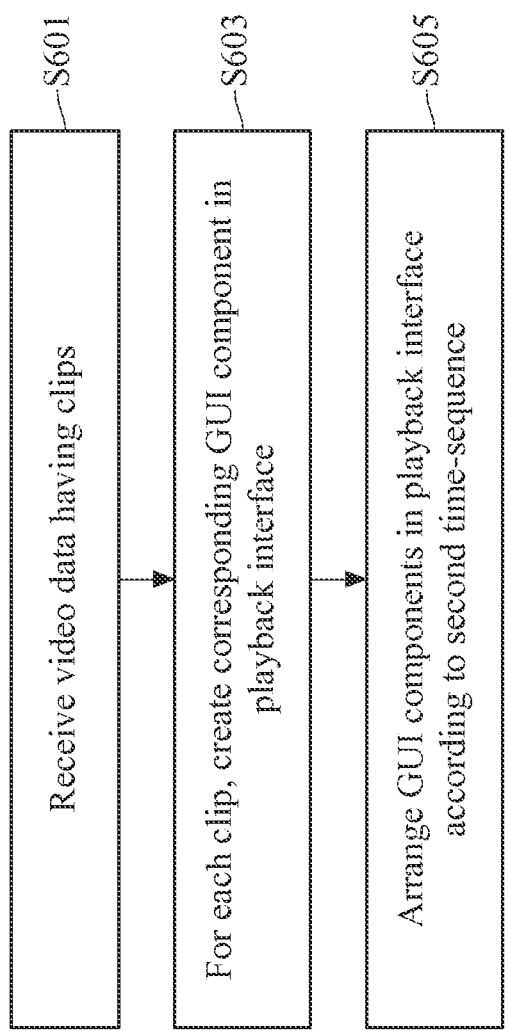
FIG. 5 is a flowchart of the pre-processing method for video data playback, according to an embodiment of the present invention.

Please refer to FIG. 5, which is a flowchart of the pre-processing method for video data playback, according to an embodiment of the present invention. As shown in FIG. 5, in step S601, the video receiver module receives a video data having a plurality of clips, each of which corresponds to a first starting number and a first ending number of a first time-sequence and corresponds to a second starting number and a second ending number of a second time-sequence. As described above, the first time-sequence may signify UTC, and the first starting and ending numbers may be timestamps of UTC. The second time-sequence may signify local time adjusted through daylight saving, and the second starting and ending numbers may be timestamps of the adjusted local time. In step S603, the display module creates in a playback interface a corresponding GUI component for each of the clips. These GUI components may or may not be selected and manipulated by the user with, say, a mouse cursor. Said manipulation may be play, delete, and so on. In step S605, the display module arranges in the playback interface the GUI components corresponding to the clips according to the second starting and ending numbers corresponding to the clips. When the first ending number corresponding to a first clip of the clips is essentially equal to the first starting number of a second clip of the clips and the second ending number corresponding to the first clip is essentially different from the second starting number corresponding to the second clip, the display module places the two GUI components corresponding to the first and second clips separately or distinguishably in the playback interface.

In one embodiment, the display module may create a timeline component in the playback interface to contain the said GUI components. The timeline component has a first dimension and a second dimension. The display module then places the GUI components along the first dimension in the timeline component according to the second starting and ending numbers corresponding to the clips.

When a first interval formed by the second starting and ending numbers corresponding to the first clip and a second interval formed by the second starting and ending numbers corresponding to the second clip overlap at least in part and form an overlap interval, the display module places at least part of the GUI components corresponding in the overlap interval to the first and second clips along the second dimension in the timeline component. When the second ending number corresponding to the first clip and the second starting number corresponding to the second clip forms a non-empty skip interval, the display module refrains from placing any GUI components in a part of the timeline component corresponding to the skip interval, as illustrated in FIG. 2 and FIG. 3.

In one embodiment, the pre-processing method for video data playback further comprises playing back the video data according to the first time-sequence of the video data, and displaying an indicator icon at a first position in the GUI component corresponding to the clip being played, wherein the first position corresponds to a second position in the video data, as illustrated in FIG. 4.

In conclusion, the present invention provides a pre-processing method for video data playback and a playback interface apparatus which deal with artificial time repetition or shortening caused by daylight saving, configuration error, or otherwise by discerning several time-sequences of the video data. Specifically, the present invention enables the user to play back and randomly access the video data on a timeline that agrees with human subjective perception, while maintaining the simplicity and uniformity of interface design.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments of the invention. It is intended, therefore, that the specification and examples be considered as exemplary only, with a true scope and spirit of the invention being indicated by the following claims and their full scope of equivalents.

What is claimed is:

1. A pre-processing method for video data playback, comprising:
    receiving a video data having a plurality of clips, wherein each of the clips corresponds to a first starting number and a first ending number of a first time-sequence and corresponds to a second starting number and a second ending number of a second time-sequence;
    for each of the clips, creating a corresponding graphical user interface (GUI) component in a playback interface; and
    arranging in the playback interface the GUI components corresponding to the clips according to the second starting numbers and the second ending numbers corresponding to the clips;
    wherein when the first ending number corresponding to a first clip of the clips is essentially equal to the first starting number of a second clip of the clips and the second ending number corresponding to the first clip is essentially different from the second starting number corresponding to the second clip, the two GUI components corresponding to the first clip and the second clip are placed in the playback interface separately or distinguishably.

2. The pre-processing method of claim 1, wherein arranging the GUI components comprises:
    creating a timeline component in the playback interface, wherein the timeline component has a first dimension and a second dimension; and
    placing the GUI components along the first dimension in the timeline component according to the second starting numbers and the second ending numbers corresponding to the clips.

3. The pre-processing method of claim 2, wherein in the step of arranging the GUI components, when a first interval formed by the second starting number and the second ending number corresponding to the first clip and a second interval formed by the second starting number and the second ending number corresponding to the second clip overlap at least in part and form an overlap interval, at least part of the GUI components corresponding in the overlap interval to the first clip and the second clip are placed along the second dimension in the timeline component.

4. The pre-processing method of claim 3, further comprising playing back the video data according to the first time-sequence of the video data, and displaying an indicator icon at a first position in the GUI component corresponding to the clip being played, wherein the first position corresponds to a second position in the video data.

5. The pre-processing method of claim 2, wherein arranging the GUI components further comprises:
    refraining from placing any of the GUI components in a part of the timeline component corresponding to a skip interval when the second ending number corresponding to the first clip and the second starting number corresponding to the second clip forms the skip interval.

6. The pre-processing method of claim 1, wherein the first time-sequence signifies Coordinated Universal Time (UTC), and the first starting numbers and the first ending numbers are timestamps of UTC.

7. The pre-processing method of claim 1, wherein the second time-sequence signifies local time adjusted through daylight saving, and the second starting numbers and the second ending numbers are timestamps of the local time adjusted through daylight saving.

8. A playback interface apparatus, comprising:
    a video receiver module configured to receive a video data having a plurality of clips, wherein each of the clips corresponds to a first starting number and a first ending number of a first time-sequence and corresponds to a second starting number and a second ending number of a second time-sequence;
    a display module configured to create a corresponding graphical user interface (GUI) component for each of the clips and arrange in the playback interface apparatus the GUI components corresponding to the clips according to the second starting numbers and the second ending numbers corresponding to the clips;
    wherein when the first ending number corresponding to a first clip of the clips is essentially equal to the first starting number of a second clip of the clips and the second ending number corresponding to the first clip is essentially different from the second starting number corresponding to the second clip, the display module places the two GUI components corresponding to the first clip and the second clip separately or distinguishably in the playback interface apparatus.

9. The playback interface apparatus of claim 8, wherein the display module is further configured to create in the playback interface a timeline component having a first dimension and a second dimension, and to place the GUI components along the first dimension in the timeline component according to the second starting numbers and the second ending numbers corresponding to the clips.

10. The playback interface apparatus of claim 9, wherein when a first interval formed by the second starting number and the second ending number corresponding to the first clip and a second interval formed by the second starting number and the second ending number corresponding to the second clip overlap at least in part and form an overlap interval, the display module is further configured to place at least part of the GUI components corresponding in the overlap interval to the first clip and the second clip along the second dimension in the timeline component.

11. The playback interface apparatus of claim 10, wherein the display module is further configured to play back the video data according to the first time-sequence of the video data, and to display an indicator icon at a first position in the GUI component corresponding to the clip being played, wherein the first position corresponds to a second position in the video data.

12. The playback interface apparatus of claim 9, wherein the display module refrains from placing any of the GUI components in a part of the timeline component corresponding to a skip interval when the second ending number corresponding to the first clip and the second starting number corresponding to the second clip forms the skip interval.

13. The playback interface apparatus of claim 8, wherein the first time-sequence signifies Coordinated Universal Time (UTC), and the first starting numbers and the first ending numbers are timestamps of UTC.

14. The playback interface apparatus of claim 8, wherein the second time-sequence signifies local time adjusted through daylight saving, and the second starting numbers and the second ending numbers are timestamps of the local time adjusted through daylight saving.

\* \* \* \* \*